May 19, 1942.  R. L. OHLS  2,283,281

VALVE

Filed June 12, 1941

Robert L. Ohls.
INVENTOR.

BY

ATTORNEYS

Patented May 19, 1942

2,283,281

UNITED STATES PATENT OFFICE 2,283,281

VALVE

Robert L. Ohls, Houston, Tex., assignor to Reed Roller Bit Company, Houston, Tex., a corporation of Texas Application June 12, 1941, Serial No. 397,698

2 Claims. (Cl. 251—102)

This invention relates to valves and more particularly has reference to valves with retractable closure elements.

A number of different types of valves with retractable closure members have been provided in which the closure members are retracted from their seats prior to movement to reduce the friction between the closure members and the valve seats. Various means have been provided for effecting the retraction of the closure members from the seats in which a force is applied to the closure members to simultaneously retract and displace the same. Under high pressure conditions the prior devices have not always worked as satisfactorily as is desirable.

The major object of this invention is to provide means for positively retracting closure members from their seats prior to movement of the closure members over the seats.

Another object of this invention is to provide a valve with retractable closure members and mechanical means for positively retracting the closure members from their seats.

Still another object of this invention is to provide a valve with retractable closure members and means for positively retracting the closure members from their seats and having a lost-motion connection with means for displacing the closure members over the seats.

A further object of this invention is to provide a valve with retractable closure members, a carrier for supporting said members, an operating device having a lost-motion connection with the carrier, and means associated with the operating device for positively retracting the closure members from their seats.

Other objects of this invention will be apparent from the following description and drawing.

Figure 1:
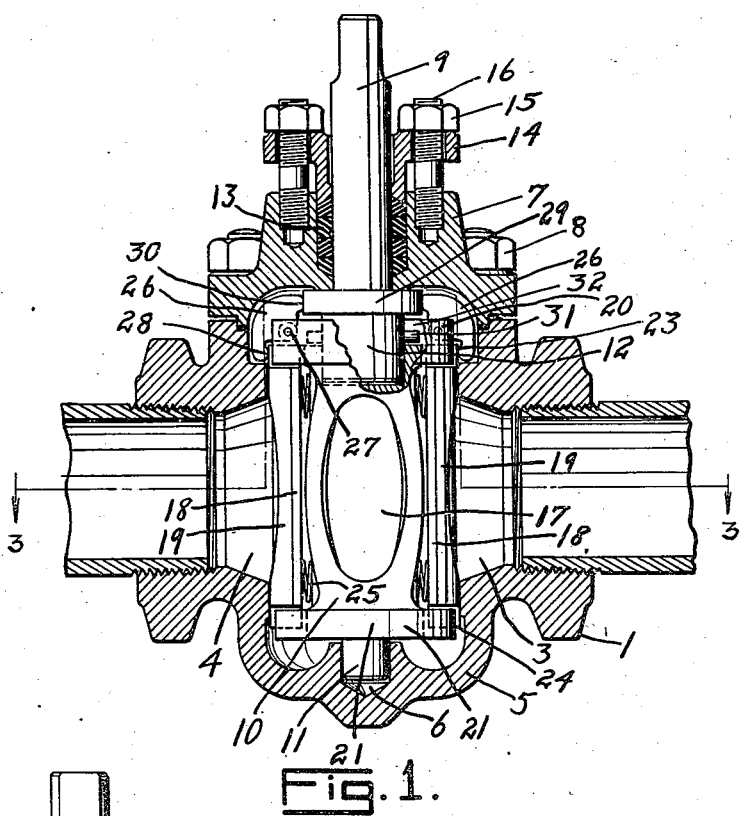
Fig. 1 is an axial sectional view of a valve embodying the concept of the present invention.

As shown in the drawing the valve according to the present invention comprises a valve body or casing 1 provided with a cylindrical bore 2 forming a valve chamber. Ports 3 and 4 serve for the inflow and outflow of fluid into and out of the chamber 2. The direction of flow of the fluid is immaterial to the operation of the valve structure.

The lower end of the valve chamber is closed by an integral closure 5 but which obviously may be formed as a separate element connected to the valve body. A center recess 6 is provided in the inner surface of the closure 5 to serve as a bearing for the valve carrier to be hereinafter described.

A closure or bonnet 7 is detachably secured to the upper portion of the valve body 1 by means of nuts 8 mounted on threaded studs carried by the body 1. An opening is provided in the central portion of the bonnet 7 which serves as a bearing for the stem or valve actuating member 9.

A carrier 10 is rotatably mounted within the valve chamber 2 and is provided with a bearing pin 11 on its lower end which is received in the recess 6. A recess or socket is provided in the upper end of the carrier 10 in which is rotatably mounted the lower enlarged end 12 of the stem 9.

The opening in the bonnet 7 through which the stem 9 extends is of a diameter somewhat larger than that of the stem 9 to provide a space for packing 13, which is compressed by means of a plunger 14 which is moved to adjusted positions by means of nuts 15 on the studs 16. With the above described construction the carrier 10 is rotatably mounted in the bore 2 for rotation about the lower bearing pin 11 and about the lower end 12 of the stem 9 or rotatable with the stem 9 which rotates in the opening in the bonnet 7.

The carrier 10 comprises a body having a flow opening 17 extending transversely therethrough which is adapted to be brought into register with ports 3 and 4 to permit free flow of fluid from one port through the flow opening to the other port. On each side of the flow opening 17 the carrier is flattened to provide a space between the body of carrier 10 and the wall of the cylindrical bore 2 for the segmental closure members 18. Seating surfaces 19 are provided on said closure segments adapted to engage the wall of the cylindrical bore. Surfaces 19 may be of metal or of resilient material to insure a tight seal with the wall of the bore 2.

Adjacent the upper and lower ends of the carrier 10 circumferential flanges 20 and 21 are provided. These flanges are provided with diametrically opposed radially extending slots 22 in which are received upwardly and downwardly extending lugs 23 and 24 of the closure segments 18. This construction enables the closure members 18 to be mounted by means of their lugs 23 and 24 in the slots 22 in the end flanges of the carrier 10 for radial movement toward and away from the cylindrical surface of the chamber 2.

Springs 25 positioned between the carrier 10 and the closure members 18 resiliently urge the closure members against the cylindrical surface of the bore or valve chamber 2.

For retracting the closure members 18 from engagement with the surface of the bore 2 small bell-crank levers 26 are pivotally mounted on pins 27 within the slots 22 of the upper flange 20 of the closure carrier 10. The downwardly extending arms 28 of the bell-crank levers 26 are positioned to engage the upper lugs 23 of the closure members to retract the closure members from engagement with the surface of the cylindrical bore 2.

An elliptical-shaped cam 29 is carried by the stem or actuating means 9 and is positioned just above the upper flange 20 in a position to engage the ends 30 of the bell-crank levers 26.

Figures 2, 3:
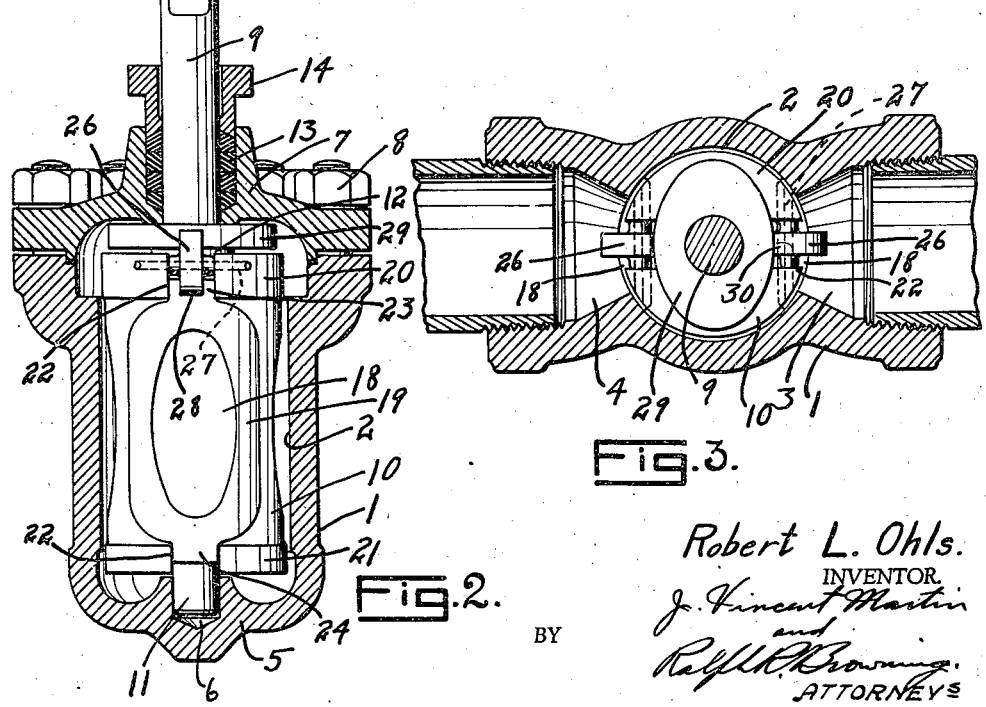
Fig. 2 is another axial sectional view taken at right angles to the view represented in Fig. 1.
Fig. 3 is a horizontal sectional view taken on line 3—3 of Fig. 1.

With the cam 29 in the position shown in Fig. 3 of the drawing the closure members 18 will be forced against the cylindrical surface of the bore 2 by means of the springs 25. When, however, the stem 9 is rotated, cam 29 will be moved to a position (rotated relative to the carrier 10) to force the ends 30 of the bell-crank 26 outwardly and thereby cause the ends 28 of the bell-crank levers 26 to move inwardly retracting the upper ends of the closure members from their seats. This will enable the carrier 10 to be rotated without undue friction due to engagement of the closure members with the cylindrical surface of the chamber 2.

As is clearly shown in Fig. 1 of the drawing the enlarged lower end 12 of the stem 9 is provided with outwardly extending lugs 31 which project into a sector-shaped recess 32 in the upper portion of the carrier 10. The sector-shaped recess 32 is of a length sufficient to permit the stem 9 to be rotated relative to the carrier through a distance to enable the closure segments 18 to be retracted from their seats before rotary movement is imparted from the stem 9 to the carrier 10. The connection provided by the pins 31 and slots 32 serves as a lost-motion connection to permit limited rotary movement of the stem 9 relative to the carrier 10.

A valve construction as herein described with the lost-motion connection between the operating stem 9 and the carrier 10 enables the closure segments to be positively retracted from their seats prior to movement of the segments over the seats. This construction is particularly advantageous and simple in that a single actuating means, i. e., the stem 9 serves both as a means for positively retracting the closure segments from their seats and as a means for positively rotating the carrier 10 to displace the closure segments from opened to closed and from closed to open positions.

Having described my invention, I claim:

1. A valve comprising a valve body having a ported valve chamber, a carrier rotatably mounted in said chamber, a closure member mounted on said carrier for displacement by the carrier to port opening and closing positions in said chamber and retractible from the wall of the chamber, an actuating stem rotatably mounted coaxially of said carrier with a lost-motion connection between the stem and carrier, a rotary cam fixed on the stem and having portions of different radial distances from the axis of the stem, a lever mounted on the end of the carrier adjacent the stem, said lever having one arm extending axially of the carrier and engaging the end of the closure member adjacent the stem and a second arm in a position to be engaged by the cam and displaced thereby upon rotation of the stem and cam relative to the carrier to effect retraction of one end of the closure member.

2. A valve comprising a valve body having a ported valve chamber, a carrier rotatably mounted in said chamber and having a disc-like flange at each end thereof, said flanges having axially and radially extending slots in the circumferential portions thereof, a closure member in said valve chamber and having lugs at the ends thereof positioned in the slots in the flanges of the carrier for displacement of the closure member to port opening and closing positions in the chamber, an actuating stem rotatably mounted coaxially of said carrier with a lost-motion connection between the stem and carrier, a rotary cam fixed on the stem and having portions of different radial distances from the axis of the stem, a lever mounted on the end of the carrier adjacent the stem, said lever having one arm extending axially of the carrier and engaging the lug of the closure member adjacent the stem end of the carrier and a second arm in a position to be engaged by the cam and displaced thereby upon rotation of the stem and cam relative to the carrier to effect retraction of one end of the closure member to break adhesion between the closure member and the valve chamber wall.

ROBERT L. OHLS.